(12) United States Patent
Xiong et al.

(10) Patent No.: US 8,458,741 B2
(45) Date of Patent: Jun. 4, 2013

(54) PROVISION OF TV ID TO NON-TV DEVICE TO ENABLE ACCESS TO TV SERVICES

(75) Inventors: True Xiong, San Diego, CA (US); Leo Pedlow, Ramona, CA (US)

(73) Assignee: Sony Corporation, Tokyo (JP)

( * ) Notice: Subject to any disclaimer, the term of this patent is extended or adjusted under 35 U.S.C. 154(b) by 385 days.

(21) Appl. No.: 12/788,620

(22) Filed: May 27, 2010

(65) Prior Publication Data

US 2011/0296454 A1 Dec. 1, 2011

(51) Int. Cl.
| | |
|---|---|
| H04N 7/16 | (2011.01) |
| H04N 7/18 | (2006.01) |
| H04N 7/173 | (2011.01) |
| H04K 1/00 | (2006.01) |
| G06F 7/00 | (2006.01) |
| H04N 21/475 | (2006.01) |
| H04N 21/436 | (2006.01) |
| H04N 7/10 | (2006.01) |
| H04N 5/44 | (2006.01) |
| H04N 21/643 | (2006.01) |
| H04N 21/472 | (2006.01) |
| G06F 17/30 | (2006.01) |
| H04N 5/50 | (2006.01) |
| H04L 9/00 | (2006.01) |

(52) U.S. Cl.
CPC ...... *H04N 21/4753* (2013.01); *H04N 21/43615* (2013.01); *H04N 7/106* (2013.01); *H04N 5/4401* (2013.01); *H04N 21/64322* (2013.01); *H04N 7/17318* (2013.01); *H04N 7/17336* (2013.01); *H04N 21/47202* (2013.01); *H04N 7/173* (2013.01); *H04N 7/17309* (2013.01); *G06F 17/30949* (2013.01); *H04N 5/50* (2013.01); *H04N 7/163* (2013.01); *G06F 17/30067* (2013.01); *H04L 9/00* (2013.01)
USPC ................... 725/30; 725/25; 725/31; 725/80; 725/85; 725/100; 725/131; 725/139; 725/151; 380/255; 380/259; 707/698

(58) Field of Classification Search
USPC .......................................................... 725/30
See application file for complete search history.

(56) References Cited

U.S. PATENT DOCUMENTS

| | | | |
|---|---|---|---|
| 6,374,402 B1 | 4/2002 | Schmeidler et al. | |
| 7,010,265 B2 * | 3/2006 | Coffin, III | 455/3.02 |
| 7,043,231 B2 * | 5/2006 | Bhatia et al. | 455/412.1 |
| 7,130,576 B1 * | 10/2006 | Gurantz et al. | 455/3.02 |

(Continued)

FOREIGN PATENT DOCUMENTS

| | | |
|---|---|---|
| JP | 2008035108 | 2/2008 |
| WO | 2009022869 | 2/2009 |
| WO | 2009052650 | 4/2009 |
| WO | 2009057965 | 5/2009 |

OTHER PUBLICATIONS

CATR/MII, "IPTV Security Requirements", International Telecommunications Union, FG IPTV-ID-0051, Jul. 10-14, 2006.

(Continued)

*Primary Examiner* — Jun Fei Zhong
*Assistant Examiner* — Michael B Pierorazio
(74) *Attorney, Agent, or Firm* — John L. Rogitz

(57) ABSTRACT

To permit non-TV CE devices to participate in a closed Internet Protocol television (IPTV) program, a non-TV CE device obtains a TV identification upon program registration which it subsequently uses to access content from the IPTV program.

7 Claims, 2 Drawing Sheets

U.S. PATENT DOCUMENTS

| | | | |
|---|---|---|---|
| 7,380,280 B2 | 5/2008 | De Jong | |
| 7,454,622 B2 | 11/2008 | Laidlaw et al. | |
| 7,669,213 B1* | 2/2010 | Wick et al. | 725/37 |
| 7,702,904 B2* | 4/2010 | Suzuki et al. | 713/163 |
| 7,761,330 B2* | 7/2010 | Yoshimine et al. | 705/14.61 |
| 7,895,445 B1 | 2/2011 | Albanese et al. | |
| 7,908,635 B2* | 3/2011 | Barton et al. | 725/134 |
| 7,913,309 B2 | 3/2011 | Starostin et al. | |
| 8,001,585 B2* | 8/2011 | Hogan et al. | 726/6 |
| 8,082,591 B2 | 12/2011 | Gu et al. | |
| 2002/0046097 A1 | 4/2002 | Yoshimine et al. | 705/14 |
| 2002/0104099 A1 | 8/2002 | Novak | |
| 2002/0196802 A1* | 12/2002 | Sakov et al. | 370/432 |
| 2004/0008972 A1 | 1/2004 | Haken | |
| 2004/0073802 A1* | 4/2004 | Seol | 713/183 |
| 2004/0123329 A1* | 6/2004 | Williams et al. | 725/111 |
| 2004/0237100 A1 | 11/2004 | Pinder et al. | |
| 2005/0086683 A1 | 4/2005 | Meyerson | |
| 2005/0089168 A1* | 4/2005 | Kahre | 380/211 |
| 2005/0108519 A1* | 5/2005 | Barton et al. | 713/155 |
| 2006/0212531 A1 | 9/2006 | Kikkawa et al. | |
| 2007/0006277 A1* | 1/2007 | Mills et al. | 725/153 |
| 2007/0061858 A1 | 3/2007 | Ura | |
| 2007/0157266 A1* | 7/2007 | Ellis et al. | 725/89 |
| 2007/0157281 A1* | 7/2007 | Ellis et al. | 725/134 |
| 2007/0256118 A1 | 11/2007 | Nomura et al. | |
| 2008/0155614 A1* | 6/2008 | Cooper et al. | 725/91 |
| 2008/0183815 A1* | 7/2008 | Unger | 709/204 |
| 2008/0200148 A1 | 8/2008 | Fink | |
| 2008/0201461 A1* | 8/2008 | Yoshiuchi | 709/223 |
| 2008/0244658 A1 | 10/2008 | Chen | |
| 2009/0007187 A1 | 1/2009 | Koul | |
| 2009/0052863 A1* | 2/2009 | Parmar et al. | 386/83 |
| 2009/0119776 A1* | 5/2009 | Palnitkar et al. | 726/25 |
| 2009/0158330 A1 | 6/2009 | Song et al. | |
| 2009/0164786 A1* | 6/2009 | Sekimoto et al. | 713/171 |
| 2009/0177542 A1* | 7/2009 | Haberman et al. | 705/14 |
| 2009/0180614 A1 | 7/2009 | Rajagopal et al. | |
| 2009/0210552 A1 | 8/2009 | Ozugur et al. | |
| 2009/0216806 A1* | 8/2009 | Feuerstein et al. | 707/104.1 |
| 2009/0222874 A1 | 9/2009 | White et al. | |
| 2009/0259640 A1* | 10/2009 | Bredikhin et al. | 707/3 |
| 2009/0265785 A1* | 10/2009 | Kwan | 726/23 |
| 2009/0271826 A1 | 10/2009 | Lee | |
| 2009/0282236 A1 | 11/2009 | Hallenstal et al. | |
| 2009/0293078 A1 | 11/2009 | Pirani et al. | |
| 2009/0293088 A1* | 11/2009 | Mukerji et al. | 725/47 |
| 2009/0299543 A1* | 12/2009 | Cox et al. | 700/299 |
| 2009/0307773 A1* | 12/2009 | Kwan | 726/23 |
| 2009/0327462 A1* | 12/2009 | Adams et al. | 709/222 |
| 2009/0328167 A1* | 12/2009 | O'Mahony | 726/6 |
| 2010/0011391 A1 | 1/2010 | Carpenter et al. | |
| 2010/0027441 A1* | 2/2010 | Curtis et al. | 370/254 |
| 2010/0071062 A1* | 3/2010 | Choyi et al. | 726/23 |
| 2010/0080163 A1* | 4/2010 | Krishnamoorthi et al. | 370/312 |
| 2010/0088751 A1* | 4/2010 | Ando et al. | 726/5 |
| 2010/0100879 A1* | 4/2010 | Katiyar | 718/1 |
| 2010/0100950 A1* | 4/2010 | Roberts | 726/7 |
| 2010/0110975 A1* | 5/2010 | Cagenius | 370/328 |
| 2010/0115587 A1* | 5/2010 | Kubota et al. | 726/3 |
| 2010/0118831 A1* | 5/2010 | Chen et al. | 370/331 |
| 2010/0122313 A1* | 5/2010 | Ivgi | 726/1 |
| 2010/0125663 A1* | 5/2010 | Donovan et al. | 709/224 |
| 2011/0010433 A1* | 1/2011 | Wilburn et al. | 709/219 |
| 2011/0023069 A1* | 1/2011 | Dowens | 725/61 |
| 2011/0093784 A1* | 4/2011 | Kiraz et al. | 715/719 |
| 2011/0106718 A1* | 5/2011 | Roberts et al. | 705/319 |
| 2011/0107382 A1* | 5/2011 | Morris et al. | 725/109 |
| 2011/0173651 A1 | 7/2011 | Perry, II | |
| 2011/0191802 A1* | 8/2011 | Haberman et al. | 725/34 |
| 2011/0209188 A1* | 8/2011 | Petersson et al. | 725/110 |
| 2011/0265171 A1* | 10/2011 | Hogan et al. | 726/7 |
| 2012/0210132 A1* | 8/2012 | Tharappel et al. | 713/168 |
| 2012/0243674 A1* | 9/2012 | Emmanuel | 379/207.12 |

OTHER PUBLICATIONS

UTStarcom, "Architecture Requirement for IPTV Authentications", International Telecommunications Union, FG IPTV-ID-0073, Jul. 10-14, 2006.

Ignacio Mas, Viktor Berggren, Rittwik Jana, John Murray, Christopher V. Rice; "IPTV Session Mobility", Jun. 12, 2009.

True Xiong, Charles McCoy, Leo Pedlow, Ling Jun Wong, "Control of IPTV Using Second Device" co-pending U.S. Appl. No. 12/844,205, final office action dated Oct. 19, 2012.

Abhishek Patil, Xiangpeng Jing, DJ Nguyen, "Internet TV Content Sharing and Revenue Generation Using Buddy Lists and Short Messages" co-pending U.S. Appl. No. 12/839,529, final office action dated Oct. 9, 2012.

True Xiong, Charles McCoy, Viral Mehtra, Leo Pedlow, Aran Sadja, "Enablement of Premium Content for Internet Video Client", co-pending U.S. Appl. No. 12/844,283, non-final office action dated Aug. 6, 2012.

True Xiong, Charles McCoy, Viral Mehtra, Leo Pedlow, Aran Sadja, "Enablement of Premium Content for Internet Video Client", co-pending U.S. Appl. No. 12/844,283, Applicants response to non-final office action filed Aug. 21, 2012.

* cited by examiner

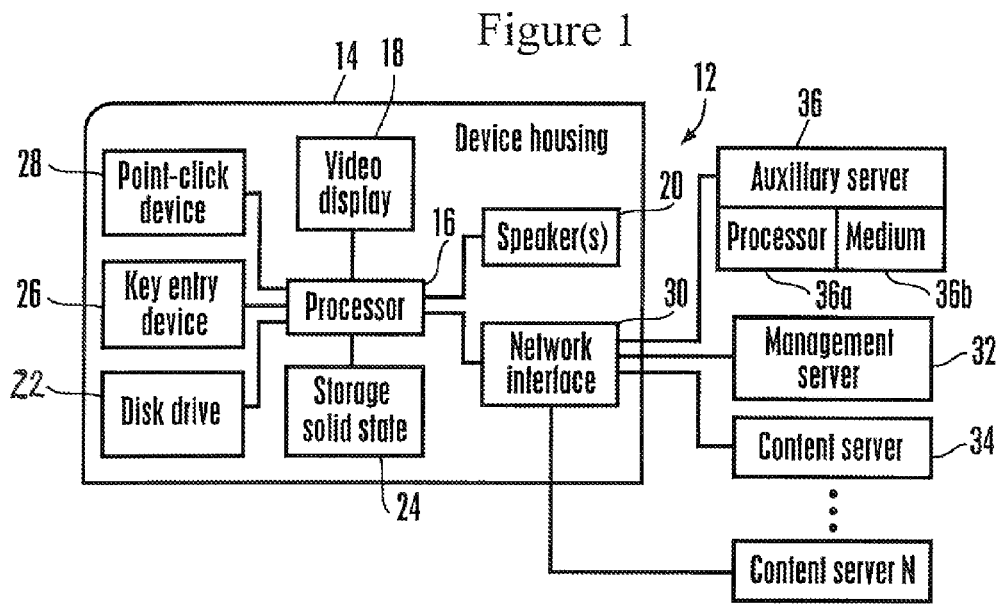
Figure 1
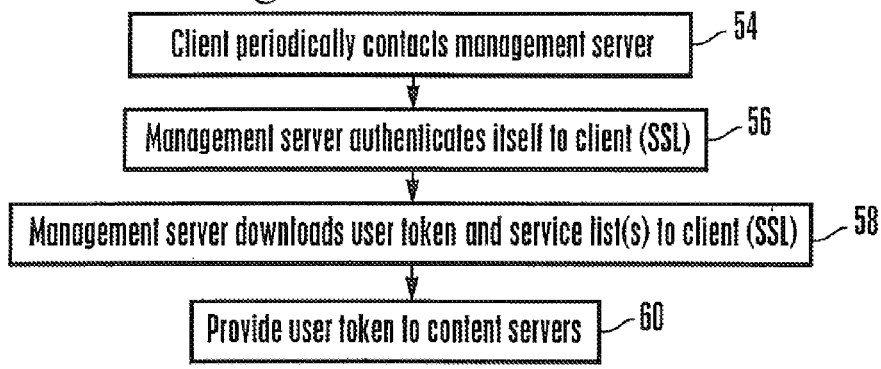
Figure 3 Authentication
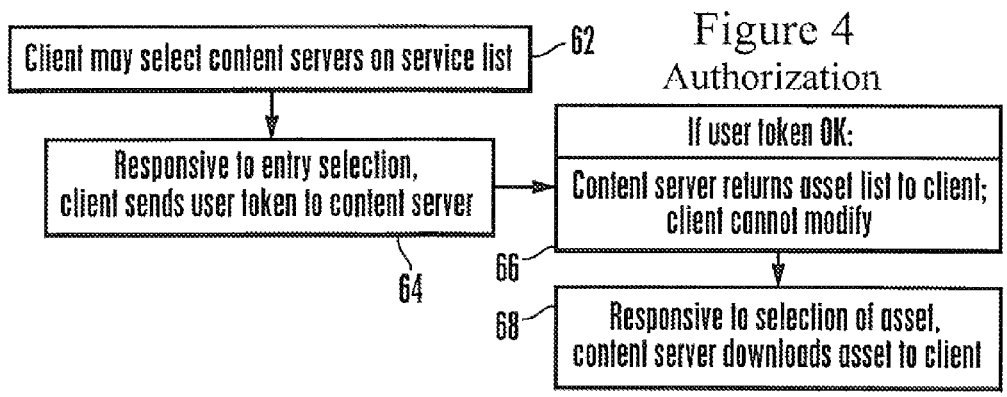
Figure 4 Authorization

US 8,458,741 B2

PROVISION OF TV ID TO NON-TV DEVICE TO ENABLE ACCESS TO TV SERVICES

I. FIELD OF THE INVENTION

The present application relates generally to providing TV identifications to non-TV consumer electronics (CE) devices to enable the devices to access TV services on a computer network.

II. BACKGROUND OF THE INVENTION

Internet access through TVs is typically provided by essentially programming the TV as though it were a computer executing a browser. Such Internet access is thus uncontrolled except as a firewall or filtering program might block certain sites.

As understood herein, uncontrolled Internet access may not be desirable in the context of a TV. A firewall or filtering program may not always be installed on the TV and even when one is installed, access remains much more uncontrolled than conventional TV programming traditionally has expected. Also, a locally installed filter can be unloaded or defeated by a user.

Accordingly, uncontrolled Internet access has several drawbacks. From a viewer's standpoint, exposure to inappropriate subject matter particularly when young viewers are watching is one concern; a much lower threshold of quality screening is another. That is, while many TV shows might not be widely considered as "quality" shows, nonetheless a TV program is usually much more selectively screened than, say, an Internet video. The expectations of TV viewers for such higher level quality screening as a consequence cannot be met by simply providing unfettered Internet access through the TV. Furthermore, TV-related entities, from content providers, manufacturers, and carriers, in most cases derive no benefit from the extension of TV to the Internet.

Present principles recognize that a closed, controlled Internet Protocol TV (IPTV) program may be established for Internet-enabled TVs to access selected Internet sites which in turn agree to provide only appropriate, quality content to TVs in the program. However, such a program may be restricted to TVs if they are based on an participating TVs providing a TV identification (TVID) that has been burned into the hardware of the TV. Without a TVID, access to the TV-Internet infrastructure may not be permitted. As recognized herein, it may be desirable to provide non-TV consumer electronic (CE) devices access to the closed, controlled TV-Internet program but such devices will not possess the requisite TVID (an ID formatted to indicate that the device is a TV), complicating opening the infrastructure to such devices.

SUMMARY OF THE INVENTION

Accordingly, a non-TV consumer electronic (CE) device includes a housing, a display on the housing, and a network interface. A processor controls the display and communicates with the Internet through the network interface. The non-TV CE device includes a non-TV CE device identification including a CE device serial number. The processor executes logic which includes prompting a user to register to use an Internet TV (IPTV) program at least in part by entering a username and password. The logic also includes providing the username and password in a secure fashion to an auxiliary server. The processor sends a request including a secure hash of at least a media access code (MAC) of the CE device and the CE device serial number. Responsive to verification of the CE device by the auxiliary server, the processor receives from the auxiliary server an encrypted string including a TVID that is different from the CE device identification and formatted as an identification of a television. Using the username and password as a key, the processor decrypts from the encrypted string the TVID. Subsequently, responsive to user input indicating a desire to access the IPTV program, the processor sends the TVID to a management server to obtain a user token and service list. The user token is sent to a content server that appears on the service list and a content list received from the content server. The logic further includes providing a user interface on the display from which a user may select content from the content list to be played on the CE device.

In some embodiments the hash of the MAC and CE device serial number provided to the auxiliary server further includes digital rights management (DRM) information and a security certificate of the CE device. If desired, the management server and auxiliary server are separate from each other. In other implementations, the management server and auxiliary server are consolidated together. Without limitation the device can be a personal computer, a personal digital assistant (PDA), or a digital clock radio.

In another aspect, a method includes providing a TVID to a non-TV CE device, and enabling the non-TV CE device to access content in a closed Internet Protocol television (IPTV) program using the TVID. The TVID is different from a CE device identification associated with the non-TV CE device.

In another aspect, a server computer includes a processor and a tangible non-transitory data storage medium accessible by the processor to execute logic. The logic includes receiving over a wide area computer network from a non-TV CE device a secure string including a username, password, and a non-TV CE device serial number. The logic decrypts the secure string, verifies contents of the string, and responsive to successful verification of the string, returns to the CE device a TVID that does not include the CE device serial number.

The details of the present invention, both as to its structure and operation, can best be understood in reference to the accompanying drawings, in which like reference numerals refer to like parts, and in which:

BRIEF DESCRIPTION OF THE DRAWINGS

FIG. 1 is a block diagram of an example system in accordance with present principles;
FIG. 3 is a flow chart of example authentication logic;
and
FIG. 4 is a flow chart of example authorization logic.

DETAILED DESCRIPTION OF THE PREFERRED EMBODIMENT

Figure 2:
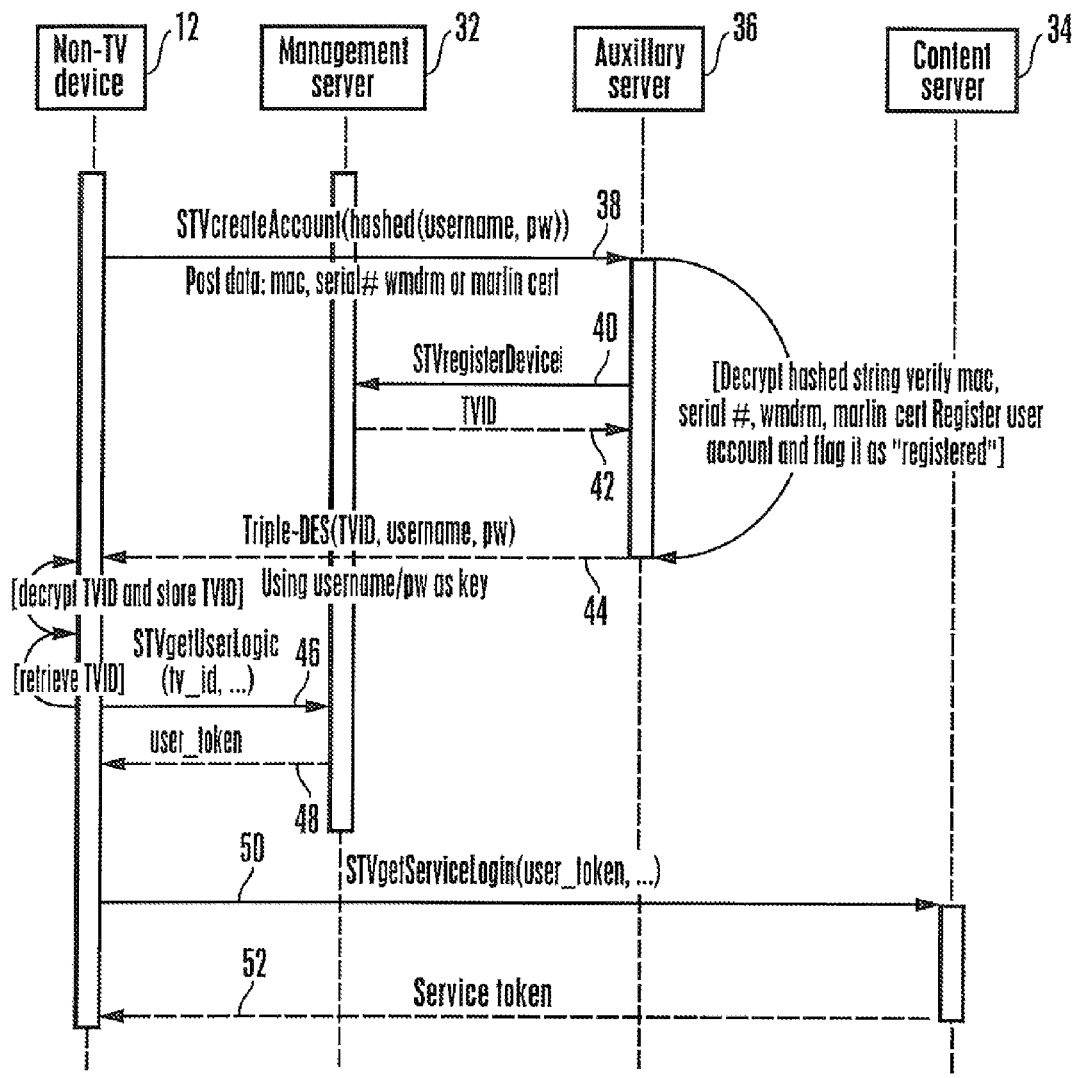
FIG. 2 is a message flow diagram.

Referring initially to FIG. 1, a non-TV CE device 12 includes a portable lightweight plastic housing 14 bearing a digital processor 16. The processor 16 can control a visual display 18 and an audible display 20 such as one or more speakers.

To undertake present principles, the processor 16 may access one or more computer readable storage media such as but not limited to disk-based storage 22 and solid state storage 24 such as dynamic random access memory (DRAM) and/or flash memory. Software code implementing present logic executable by the CE device 12 may also be stored on one of the storage devices shown to undertake present principles. Also, an identification unique to the CE device, typically including a non-TV CE device model number and serial number, can be stored on one of the storage media.

The processor 16 can receive user input signals from a key input device 26 such as a keypad and a point and click input device 28.

As shown in FIG. 1, a network interface 30 such as a wired or wireless modem or wireless telephony transceiver communicates with the processor 16 to provide connectivity to a management server 32 on the Internet, multiple content servers 34, and in some implementations an auxiliary server 36, although the functions of the management server 32 and auxiliary server 36 may be consolidated in a single server if desired. The servers 32, 34, 36 have respective processors and data store for executing present logic. For instance, the auxiliary server 36 can have a server processor 36a and a tangible non-transitory data storage medium 36b.

The non-TV CE device 12 may be, e.g., a laptop computer, a digital clock radio, a mobile telephone, a personal digital assistant, etc.

Now referring to FIG. 2, when a user of the CE device 12 wishes to view audio-video content, the user typically selects ("launches") a media player such as a software-implemented media gallery application (MGA). According to an example embodiment the processor 16 checks to see if it possesses a TVID, e.g., a concatenation of a TV model number and serial number. Until the user executes initial registration this test will be false since the CE device 12 has only a non-TV CE device ID.

Under these conditions (no TVID) the processor 16 presents on the display 18 a user interface prompting the user to enter IPTV account registration such as username and password, which can be hashed and provided at state 38 in FIG. 2 to the auxiliary server 36. In an example the processor 16 under control of the MGA sends a call "STVcreateAccount" to the auxiliary server 36 using a secure mode of hypertext transfer protocol (HTTPS), e.g., a URL with parameters: username, password. A HTTP POST request is sent which may include a hash using secure hash algorithm (SHA)-256 of the media access code (MAC), serial number, Windows Media digital rights management (WMDRM), and security certificate of the CE device 12. The MAC, serial number, and certificate are unique to the CE device 12 and are already possessed by the auxiliary server 36, which typically is affiliated with the manufacturer of the CE device 12 or which otherwise has access to identifying information of the CE device 12.

The auxiliary server 36 then decrypts the hashed string and verifies the contents of the POST message against its records. If the CE device 12 has already been registered with the auxiliary server 36, an "error" message is returned, to prevent a hacker who has guessed the hashed string of the CE device 12 from registering another device.

Assuming that the information in the POST message from the CE device 12 is verified, the user account is created by the auxiliary server 36. In one example the server 36 links the encrypted sha256 string to the username/password input by the user and turns on a flag indicating that the particular CE device 12 with the registration username and password has been registered.

In the example shown, the auxiliary server 36 at state 40 sends a business-to-business (B2B) call message, referred to in the diagram as a "STVregistereDevice call", to the management server 32. The call may include the serial number of the CE device 12. This call requests an unused or newly created TVID of the management server 32, which returns the requested TVID at state 42 to the auxiliary server 36. At the management server 32 the TVID is linked to the serial number of the CE device 12. When the management server 32 and auxiliary server 36 are consolidated states 40 and 42 are not necessary. In any case, the TVID returned by the management server 32 is different from the non-TV CE device ID in that the TVID contains a TV serial number and in some implementations a TV model number.

The auxiliary server 36 then combines the TVID with the username and password, encrypts the combination using, e.g., triple-data encryption standard (DES), and at state 44 returns the encrypted string to the CE device 12. The auxiliary server 36 also links the TVID to the username and password.

The CE device 12 decrypts the TVID using the username and password as the key and stores the TVID on, e.g., the disk drive 22 or solid state memory 24 in FIG. 1. When the user of the CE device 12 subsequently wishes to obtain Internet content from the closed IPTV program, the TVID is sent at state 46 to the management server 32 to obtain, at state 48, a user token and service list, which in turn is sent at state 50 to a content server 34 that appears on the service list which returns a service token at state 52 to the CE device 12 which the CE device 12 may use to obtain content from content server 34. FIGS. 3 and 4 provide further details regarding states 46-52.

Indeed and now referring to FIG. 3, at block 54 the CE device 12 periodically checks in with the management server 32. Proceeding to block 56, the management server 32 authenticates itself to the CE device 12 so that the CE device 12 knows that it is contacting the correct server and is not being spoofed. The authentication may be undertaken using, e.g., SSL certificates. The CE device 12 can then send to the server 32 a unique CE device ID in a SSL, without requiring key encryption of the processor 16. The CE device 12 may verify the server 32 using the public key of the certificate authority of the server certificate returned by the server 32.

Block 58 indicates that next in the logic flow, the management server 32 downloads to the CE device 12 a user token along with one or more service lists each of which contains a list of network addresses of approved content servers 34. This may be done again using SSL. The user token preferably has an expiration period after which it is no longer accepted by content servers during the authorization logic discussed below. The management server 32 provides the user token along with its expiration time to the content servers 34 for purposes to be shortly disclosed.

The service list is typically presented by the processor 16 in a user interface (UI) presented on the display 18. The UI may simply present icons of service providers associated with the various approved content servers 34 whose network addresses can underlie the UI in the list. The UI may also present other content as desired such as the names of genres available at each content server, etc. In any case, a user of the CE device 12 may manipulate the input device 26 to select a member of the service list at block 60, which causes the processor 16 to upload, though the network interface 30, the user token to the selected content server 34 to enter the authorization logic of FIG. 4.

As discussed above, only content servers 34 on the closed and unmodifiable (except by the management server 32) service list(s) downloaded to the CE device 12 by the management server 32 can be selected by the user when in the IPTV program, as indicated at block 62. As new services (embodied by newly approved content servers 34) become available, they can be added to the service list(s) and, hence, made available across all platforms on the fly.

Recall that user tokens and their expiration times are provided by the management server to the content servers 34. Each content server 34 can then maintain a local database of active user tokens, removing each one at its respective expiration time. When a content server 34 receives a user token at block 64, it checks it against the local database of active tokens and if the user token is in the database, the logic moves to block 66 wherein the content server 34 returns a content list to the CE device 12 along with the above-mentioned service token. Thus, no further authentication is required between the CE device 12 and content server 34 beyond the provisioning of an active user token by the CE device 12. And, by virtue of the content server 34 appearing on the service list provided by the management server 32, the CE device 12 knows that it may trust the content server 34 without need for any further authentication on the part of the content server 34.

Essentially, a content list is a list of audio-video programs that the entity associated with the content server 34 has elected to make available to platforms in the IPTV system. Like the service list, the content lists from the content servers 34 cannot be modified by the CE device 12.

Moving to block 68, the user may manipulate the input device 26 to select a program on the content list, which is then delivered assuming the request is accompanied by a valid service token, as by streaming, from the content server 34 to the CE device 12 for presentation on the display 18 and speakers 20.

While the particular PROVISION OF TV ID TO NON-TV DEVICE TO ENABLE ACCESS TO TV SERVICES is herein shown and described in detail, it is to be understood that the subject matter which is encompassed by the present invention is limited only by the claims. For example, while the logic above is divulged using the TV as an example, it can also be implemented on the baby monitor, digital alarm clock, or other CE device.

What is claimed is:

1. Consumer electronic (CE) device that is not a television and without a TVID comprising:
    display;
    network interface;
    processor controlling the display and communicating with a wide area network through the network interface;
    the CE device that is not a television and without a TVID including a CE device identification including a CE device serial number;
    the processor configured for executing instructions including:
        prompting a user to register to use an Internet Protocol television (IPTV) program at least in part by entering a username and password;
        wherein a TVID uniquely identifies a television and is formatted to indicate that a device is a television;
        providing the username and password in a secure fashion to an auxiliary server, the processor sending a request including data unique to the CE device;
        receiving from the auxiliary server, responsive to the auxiliary server verifying the data unique to the CE device, a virtual TVID, the virtual TVID being different from the CE device identification, the virtual TVID being formatted the same way as the TVID;
        responsive to the verification of the CE device by the auxiliary server, receiving from the auxiliary server an encrypted string including the virtual TVID;
        decrypting the encrypted string;
        in response to determining that the CE device has a virtual TVID and responsive to user input indicating a desire to access the IPTV program, sending the virtual TVID to a management server to obtain a user token and service list, wherein at least a TVID or a virtual TVID is required by the management server to access the IPTV program;
        in response to user selection from the server list, sending the user token to a content server that appears on the service list;
        receiving a content list from the content server; and
        providing a user interface on the display from which the user may select content from the content list to be played on the CE device.

2. The CE device of claim 1, wherein the data unique to the CE device includes a hash of a media access code (MAC) and a CE device serial number and is provided to the auxiliary server and further includes digital rights management (DRM) information and a security certificate of the CE device.

3. The CE device of claim 1, wherein the management server and auxiliary server are separate from each other.

4. The CE device of claim 1, wherein the management server and auxiliary server are consolidated together.

5. The CE device of claim 1, wherein the CE device is a personal computer.

6. The CE device of claim 1, wherein the CE device is a personal digital assistant (PDA).

7. The CE device of claim 1, wherein the CE device is a digital clock radio.

* * * * *